(12) United States Patent
Pandit et al.

(10) Patent No.: US 7,665,074 B2
(45) Date of Patent: Feb. 16, 2010

(54) MECHANISM FOR CONVERTING TEXT OUTPUT INTO OBJECTS

(75) Inventors: Bhalchandra S. Pandit, Redmond, WA (US); Bruce G. Payette, Bellevue, WA (US); James W. Truher, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 655 days.

(21) Appl. No.: 10/998,477

(22) Filed: Nov. 29, 2004

(65) Prior Publication Data

US 2006/0064668 A1    Mar. 23, 2006

Related U.S. Application Data

(63) Continuation of application No. 10/944,459, filed on Sep. 17, 2004.

(51) Int. Cl.
*G06F 9/45* (2006.01)
(52) U.S. Cl. .................................................... 717/143
(58) Field of Classification Search .............. 717/114, 717/141, 143–144; 707/10, 100; 715/234; 709/227, 231; 719/316, 328
See application file for complete search history.

(56) References Cited

U.S. PATENT DOCUMENTS

| | | | |
|---|---|---|---|
| 5,812,122 A | 9/1998 | Ng | |
| 6,463,440 B1 | 10/2002 | Hind et al. | |
| 6,625,590 B1 | 9/2003 | Chen et al. | |
| 6,629,128 B1 | 9/2003 | Glass | |
| 6,658,625 B1 | 12/2003 | Allen | |
| 7,146,422 B1 * | 12/2006 | Marlatt et al. | ............... 709/227 |
| 2003/0001894 A1 | 1/2003 | Boykin et al. | |
| 2003/0018765 A1 | 1/2003 | Muhlestein et al. | |
| 2003/0050997 A1 | 3/2003 | Hickey et al. | |
| 2003/0167162 A1 | 9/2003 | Simpson et al. | |
| 2003/0167276 A1 | 9/2003 | Simpson et al. | |
| 2003/0229885 A1 | 12/2003 | Gowndor et al. | |
| 2004/0024897 A1 | 2/2004 | Ladd et al. | |
| 2006/0004826 A1 | 1/2006 | Zartler et al. | |

OTHER PUBLICATIONS

Jeffrey P. Snover, "Monad Manifesto", Aug. 22, 2002 pp. 1-16.*

* cited by examiner

*Primary Examiner*—Tuan Anh Vu
(74) *Attorney, Agent, or Firm*—Lee & Hayes, PLLC

(57) ABSTRACT

The techniques and mechanisms described herein are directed at converting text into objects based on a template that describes the format of the text, where the format of the text is not in a standardized format. The objects then being available for further processing. The conversion mechanism converts the text into a dead object. The template comprises an object header indicator and a corresponding object header pattern. A new object is created based on the object header pattern identified within the text. In addition, the template comprises one or more field indicators each having a corresponding field pattern. The field pattern may be in a format of a regular expression. A field type and associated value are created from a string associated with the field pattern.

23 Claims, 6 Drawing Sheets

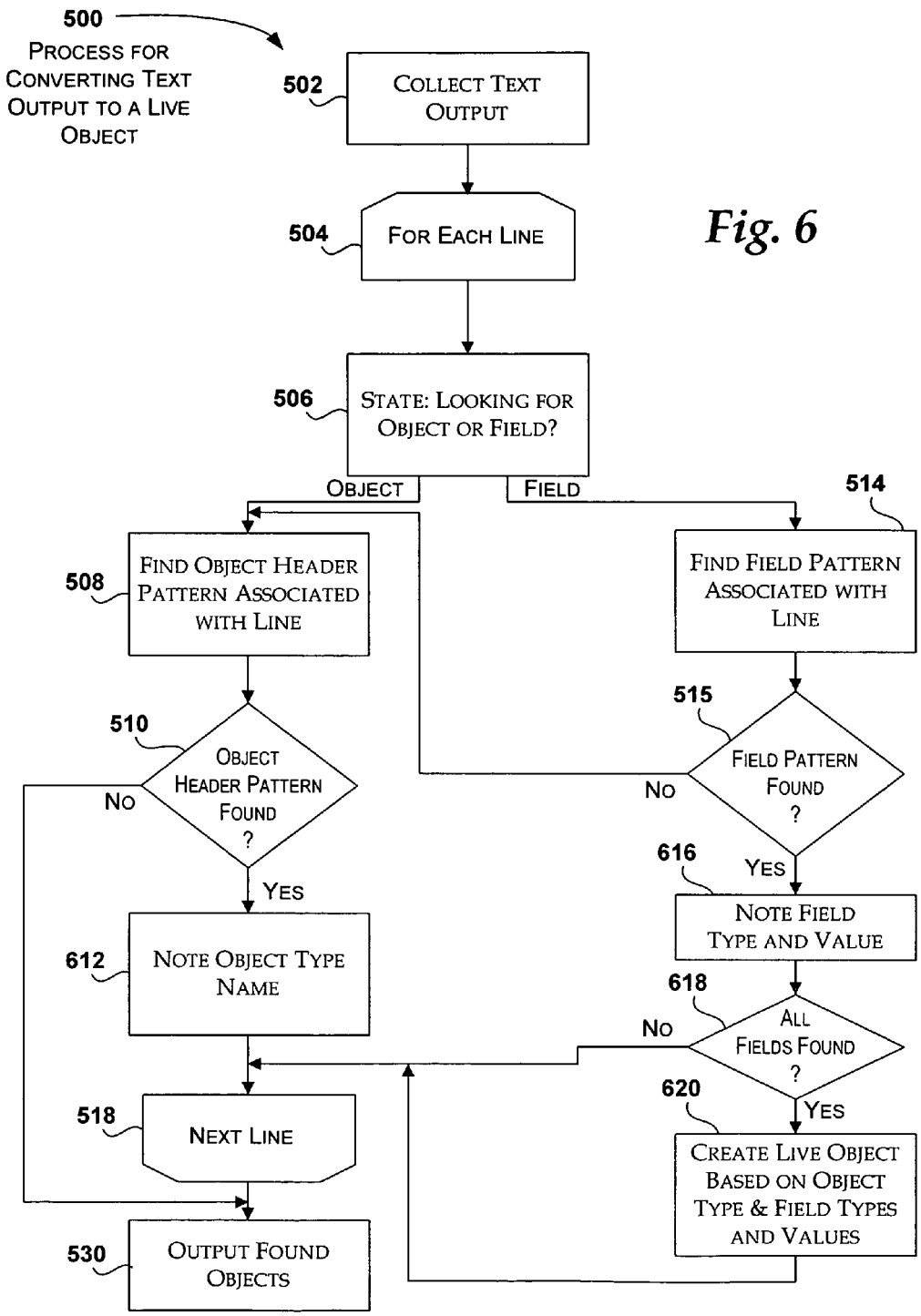

MECHANISM FOR CONVERTING TEXT OUTPUT INTO OBJECTS

RELATED APPLICATIONS

This is a continuation of U.S. patent application Ser. No. 10/944,459, filed Sep. 17, 2004.

TECHNICAL FIELD

This document generally relates to text conversion mechanisms, and more particularly, to mechanisms for converting text output into objects.

BACKGROUND

In traditional command-line environments, commands execute and produce text output. The text output may then be pipelined to another command that parses the text output and performs additional processing. Recently, an object-based command-line environment has been developed. Commands (i.e., cmdlets) in the object-based command-line environment pass objects between each other. These cmdlets are not regular .exe files, but are rather a form of managed code assemblies. The operation of these cmdlets within the object-based command-line environment provides many benefits and increased functionality over the traditional command-line environments.

Unfortunately, there are many traditional commands written for the traditional command-line environment that can not utilize the features provided by the new object-based command-line environment when they are executed in the new environment. One way in which these traditional commands may utilize the new features is by re-writing the traditional commands as cmdlets. Another way is by writing a unique wrapper for each traditional command, where the wrapper is configured to generate the objects that can utilize the functionality provided by the new object-based command-line environment. Both of these approaches, however, involve a huge expense in code development and testing.

Therefore, there is a need for a mechanism that will allow traditional commands to utilize features provided in the new object-based command-line environment without having to incur a huge expense in code development and/or testing of the commands.

SUMMARY

The techniques and mechanisms described herein are directed at converting text into objects based on a template that describes the format of the text, where the format of the text is not in a standardized format. The objects then being available for further processing. The conversion mechanism converts the text into a dead object. The template comprises an object header indicator and a corresponding object header pattern. A new object is created based on the object header pattern identified within the text. In addition, the template comprises one or more field indicators each having a corresponding field pattern. The field pattern may be in a format of a regular expression. A field type and associated value are created from a string associated with the corresponding field pattern.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 6 is a flow diagram illustrating an exemplary text conversion process for converting text output from the traditional command into a live object, the text conversion process being suitable for use within the flow diagram illustrated in FIG. 4

DETAILED DESCRIPTION

Briefly, the present text conversion mechanism converts text output into an object based upon a description of the text output in an output template. The object may then be used in further processing. The following description describes the text conversion mechanism as utilized within an administrative tool environment. However, after reading the following description, one skilled in the art will appreciate that the text conversion mechanism may be utilized in other environments and is applicable to other scenarios. While each of these other environments is not individually described, one will appreciate that the scope of the claimed text conversion mechanism includes operation within these other environments.

The following detailed description is divided into several sections. A first section describes an illustrative computing environment in which the present text conversion mechanism may operate. A second section describes an exemplary implementation for converting text output into an object within an administrative tool environment. A third section describes an exemplary process for converting the text output into an object.

Figure 1:
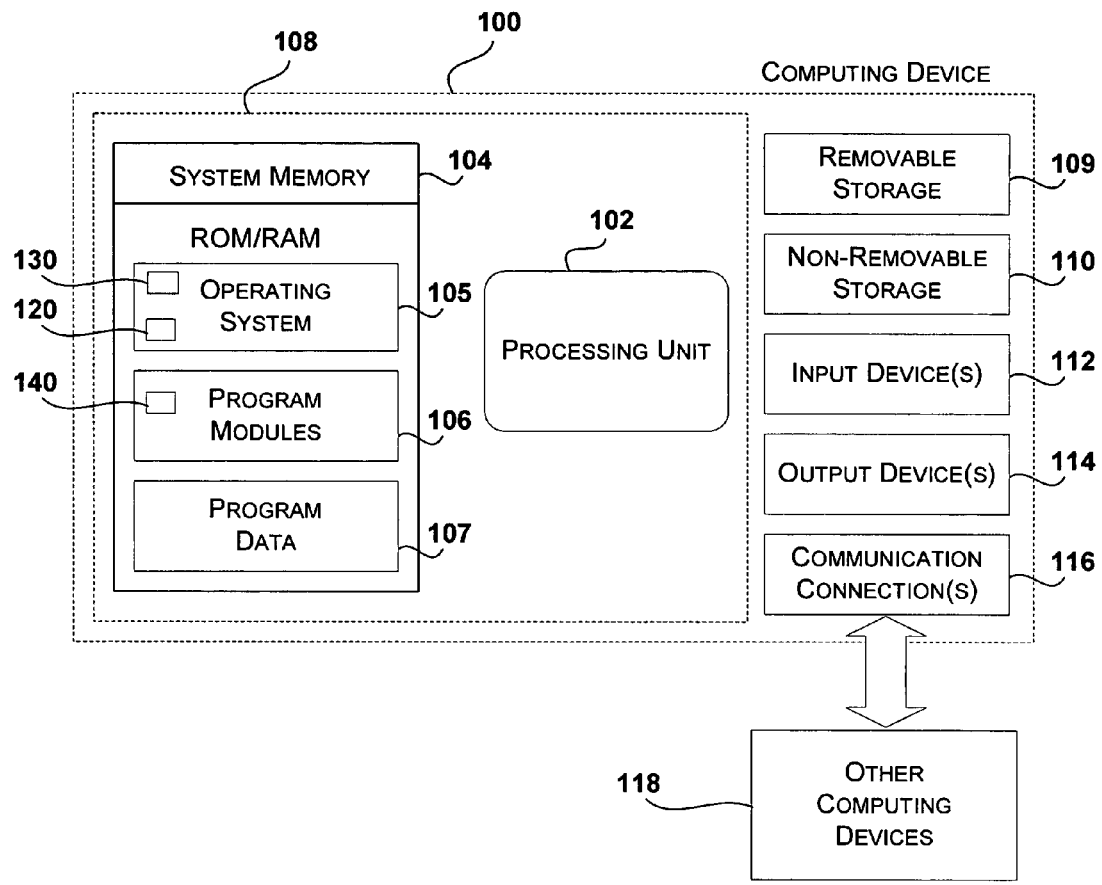
FIG. 1 is an illustrative computing device that may be used to implement the techniques and mechanisms described herein.

FIG. 1 illustrates one exemplary system for implementing the present text conversion mechanism. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. For one embodiment of the present text conversion mechanism, the system memory 104 may also include a component-based framework 120 that supports components (including properties and events), objects, inheritance, polymorphism, reflection, and provides an object-oriented component-based application programming interface (API), such as that of the .NET™ Framework manufactured by Microsoft Corporation, Redmond, Wash.

For this embodiment, the system memory 104 may also include an administrative tool framework 130 that interacts with the component-based framework 120 to support development of administrative tools (not shown). The component-based framework 120 and the administrative tool framework 130 may reside as part of the operating system 105 (as shown) or may reside as part of the program modules 106. The program modules 106 may include one or more components 140 for implementing the present text conversion mechanism as described below. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
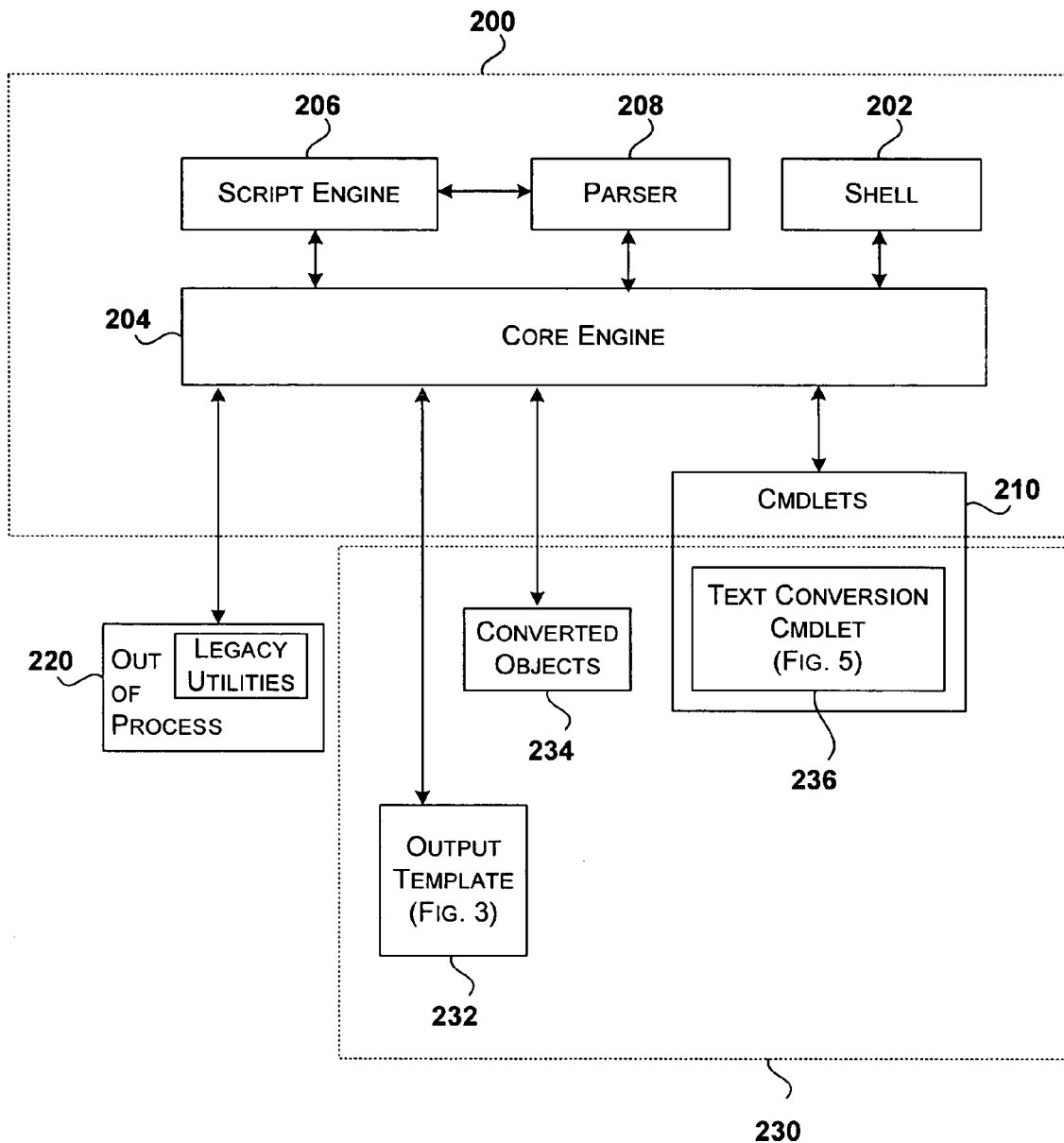
FIG. 2 is a functional block diagram generally illustrating components of one embodiment of an administrative tool environment in which the present text conversion mechanism may operate.

FIG. 2 is a functional block diagram generally illustrating components of one embodiment of an administrative tool environment (the "framework") 200 in which the present text conversion mechanism 230 may operate. The framework 200 is preferably installed on a computing system, such as the computing device 100 described above. In the particular embodiment, the framework 200 is an object-based architecture in which commands issued via an input mechanism (e.g., a command line) generate one or more objects that include the results of the command. The one or more objects may then be passed from one command to the next command in a pipeline. Because the framework provides object-based pipelining of commands, it provides superior performance and control in comparison with text-based command line architectures.

However, as described above, there are many traditional commands (e.g., legacy utilities) 220 that only output text. Thus, these traditional commands 220 can not utilize the superior performance and flexibility provided by the framework 200. Thus, as will be described, the present conversion mechanism 230 allows the text output generated from traditional commands 220 to be converted into an object which can then be further processed using other commands/cmdlets available within the framework 200. Thus, the focus of the following discussion is on the text conversion mechanism 230 that converts text output into an object. The utilization of the text conversion mechanism 230 within the described framework 200 provides one illustrative embodiment. Therefore, even though the framework 200 may have other components and mechanisms, these other components and mechanisms are not described here for the sake of brevity and clarity. However, the lack of a discussion here of those other mechanisms does not imply that the present conversion mechanism is not applicable in the presence of those other mechanisms. For more information about one particular framework which is particularly suited to the present conversion mechanism, refer to U.S. patent application Ser. No. 10/693,785, U.S. Pat. No. 7,155,706, entitled "Administrative Tool Environment", which is owned by the same assignee as the present conversion mechanism, and is incorporated here by reference.

The framework 200 includes a shell 202, a core engine 204, a script engine 206, and a parser 208. The shell 202 represents one mechanism for managing the interactions between a user and the other components within the framework 200. The shell 202 allows a user to provide commands to the computing system. The shell 202 also provides a mechanism to present feedback to the user, such as by displaying results of a command. The shell 202 may provide a graphical, textual, audible, or other interface.

Generally speaking, the core engine 204 manages the flow of information through the framework 200. The core engine 204 interacts with the shell 202 to receive command-line instructions. In the case where a command-line instruction is complex and contains multiple commands in a pipeline, the core engine 204 may interface with the parser 208 to decompose the command line instruction into its constituent commands. The parser 208 may additionally resolve any parameters that may be associated with a particular command and identify those to the core engine 204. The parser 208 also maps input requests into uniform cmdlet objects that are used throughout the framework 200. The core engine 204 also interacts with the shell 202 to present any output to the user.

The script engine 206 provides mechanisms and services to tie multiple cmdlets together using a script, where a script is an aggregation of command lines that share session state under strict rules of inheritance. The multiple command lines within the script may be executed either synchronously or asynchronously, based on the syntax provided in the input request. The script engine 222 has the ability to process control structures, such as loops and conditional clauses and to process variables within the script.

The framework 200 also includes various commands 210. The commands 210 are, typically, executables directed at managing system properties. Throughout the following discussion, the term "cmdlet" is used interchangeably with the term command to refer to commands that are used within framework 200. Thus, cmdlets correspond to commands in traditional command-line environments, but are quite different than these traditional commands. For example, cmdlets are typically smaller in size than their counterpart commands because the cmdlets can utilize common functions provided by the framework, such as parsing, data validation, error reporting, and the like. Because such common functions can be implemented once and tested once, the use of cmdlets throughout the framework allows the incremental development and test costs associated with application-specific functions to be quite low compared to traditional environments.

In addition, in contrast to traditional command-line environments, cmdlets do not need to be stand-alone executable programs. Rather, cmdlets may run in the same processes within the framework. This allows cmdlets to exchange "live" objects between each other. This ability to exchange "live" objects allows the cmdlets to directly invoke methods on these objects. Thus, the term "live" object refers to objects that have methods that are directly invocable. The methods that are directly invocable are specific to the data type of the live object. In contrast, a "dead" object refers to an object that does not have methods that are directly invocable.

Having described the above framework 200, the advantages and usefulness of the present text conversion mechanism 230 for use within framework 200 is easily discernable. Thus, by utilizing the present text conversion mechanism 230, the text output (not shown) generated by traditional utilities 220 may be converted into a "live" or "dead" object and made available for further processing within framework 200.

Figure 3:
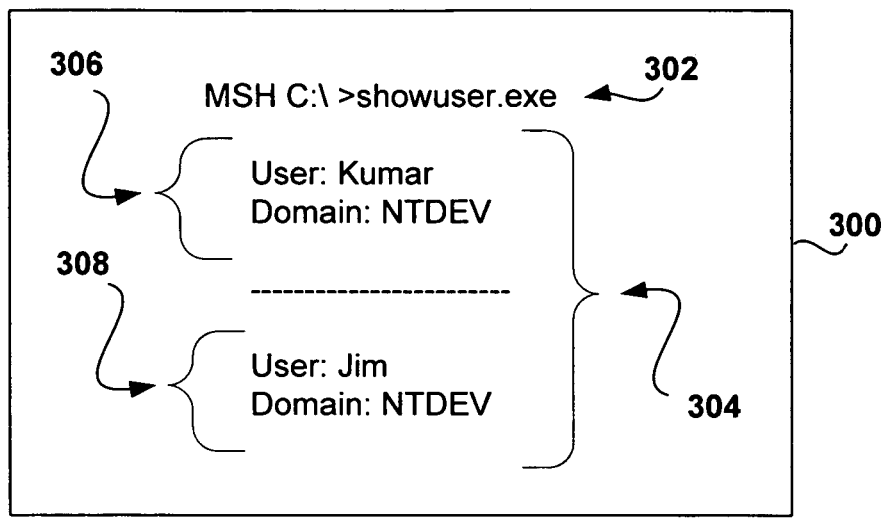
FIG. 3 is a graphical representation of a structure for an output template that may be used in implementations of the present text conversion mechanism.
Figure 3:
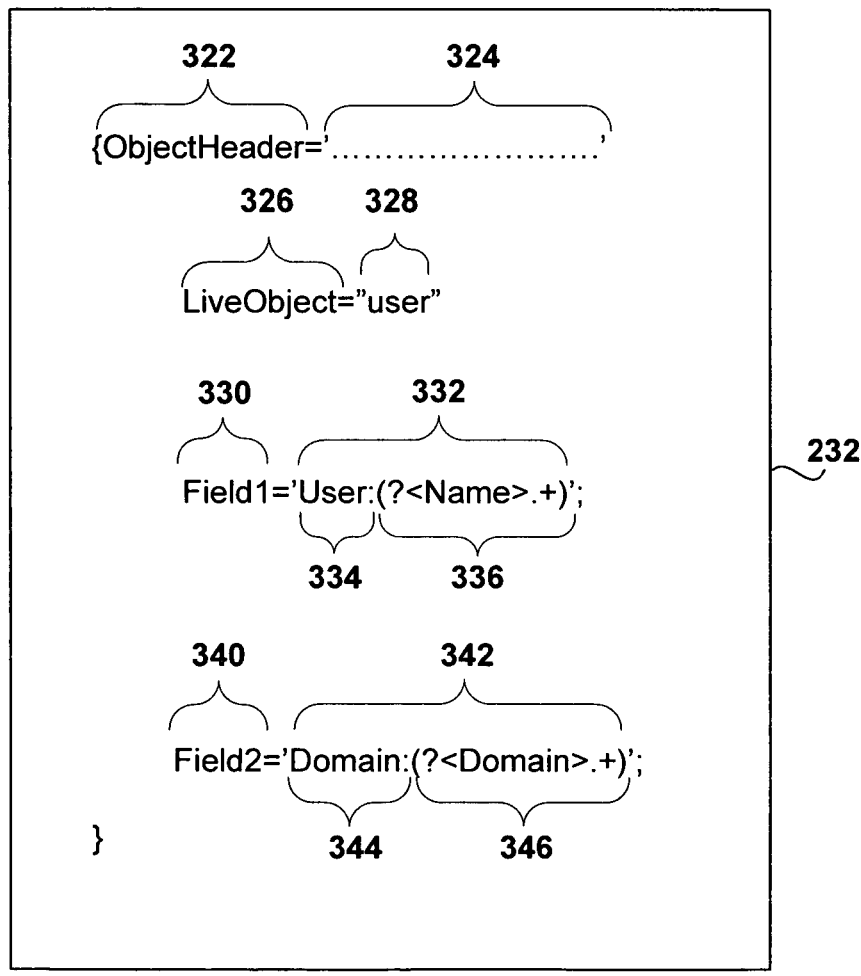

The present text conversion mechanism 230 includes an output template 232 and a text conversion cmdlet 236. One example of an output template 232 is illustrated in FIG. 3 and described below. Briefly stated, the output template 232 defines a structure for one or more converted objects 234 that are generated from the text output produced by the traditional utility 220. One example of the processing performed by text conversion cmdlet 236, in conjunction with processing performed within framework 200, is illustrated in FIGS. 4-5 and described below.

FIG. 3 is a graphical representation of a structure for an output template 232 that may be used in implementations of the present text conversion mechanism. First, before describing the output template 232, a display 300 illustrating a command string 302 and its resulting text output 304 is shown. The text output 304 provides information 306 and 308 regarding two individual users and the domain of which they are a member.

The output template 232 is created by some individual or process that is aware of the format of the text output 304. Thus, the output template 232 identifies an object header indicator 322 and a corresponding object header pattern 324. Using the example text output 304, the object header indicator defines the object header pattern 324 as a series of dashes. The output template 232 also identifies one or more fields associated with the object. For example, for the above example, two fields are defined. Each field is identified using a field indicator (e.g., field indicator 330 and 340) and an associated field pattern (e.g., field pattern 332 and 342), respectively. The field patterns 332 and 342 may take the form of a regular expression, where the term regular expression refers to a language for describing strings. The use of regular expressions for describing strings is well known in the art and is only described as necessary for describing the present text conversion mechanism 230. Therefore, the regular expression includes a static portion (e.g., static portion 334 and 344) that identifies actual text (e.g., "User:" and "Domain:") that will be encountered in the text output 304. The regular expression also includes a dynamic portion (e.g., dynamic portions 336 and 346) that identifies the name for the field within the object and signals the parser to obtain the data after the static portion and assign the data as a value for the corresponding field. It is important to note that the field patterns 332 and 342 may take other forms than regular expressions without departing from the scope and spirit of the present text conversion mechanism.

Figure 4:
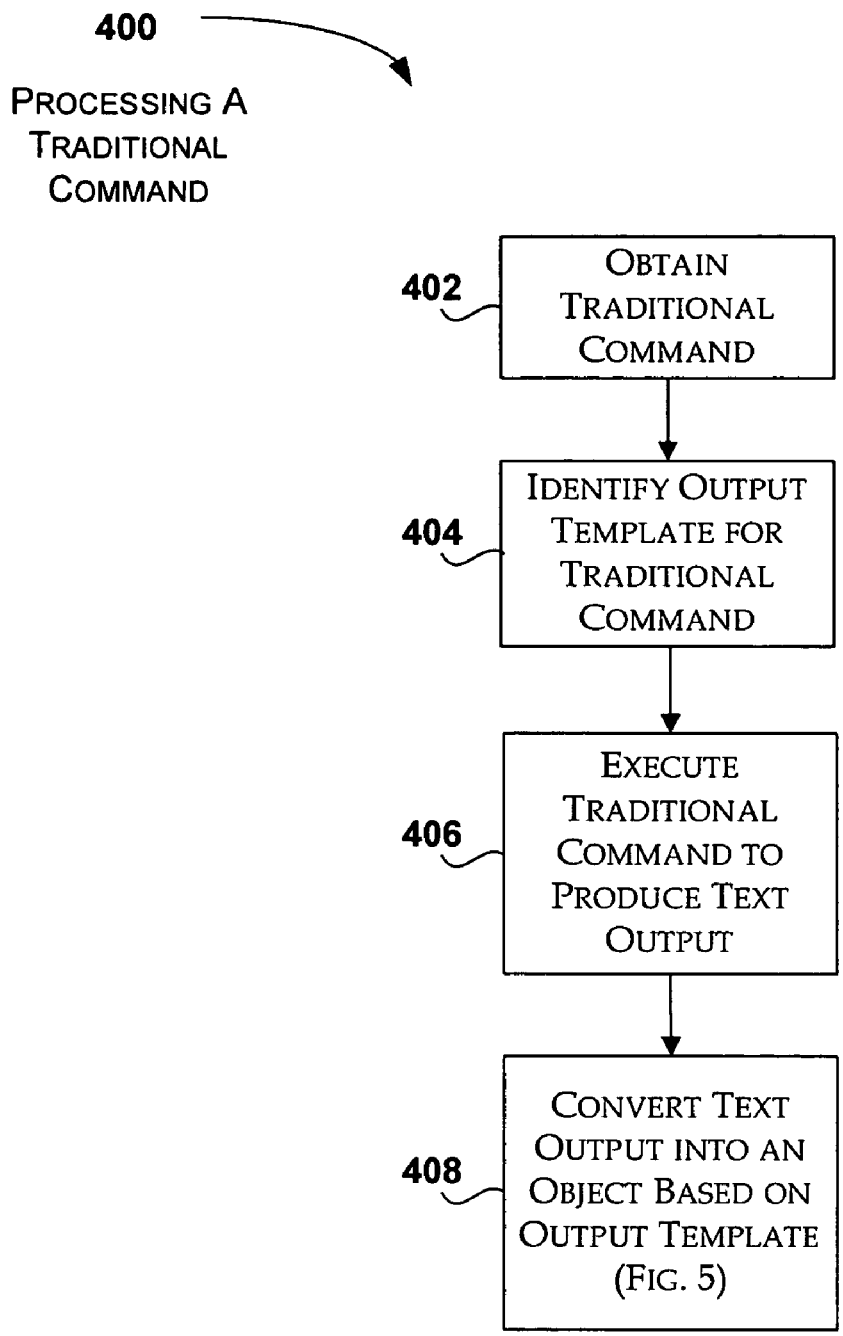
FIG. 4 is a flow diagram illustrating an exemplary process for processing a traditional command within the administrative tool framework shown in FIG. 2 utilizing the present text conversion mechanism.
Figure 5:
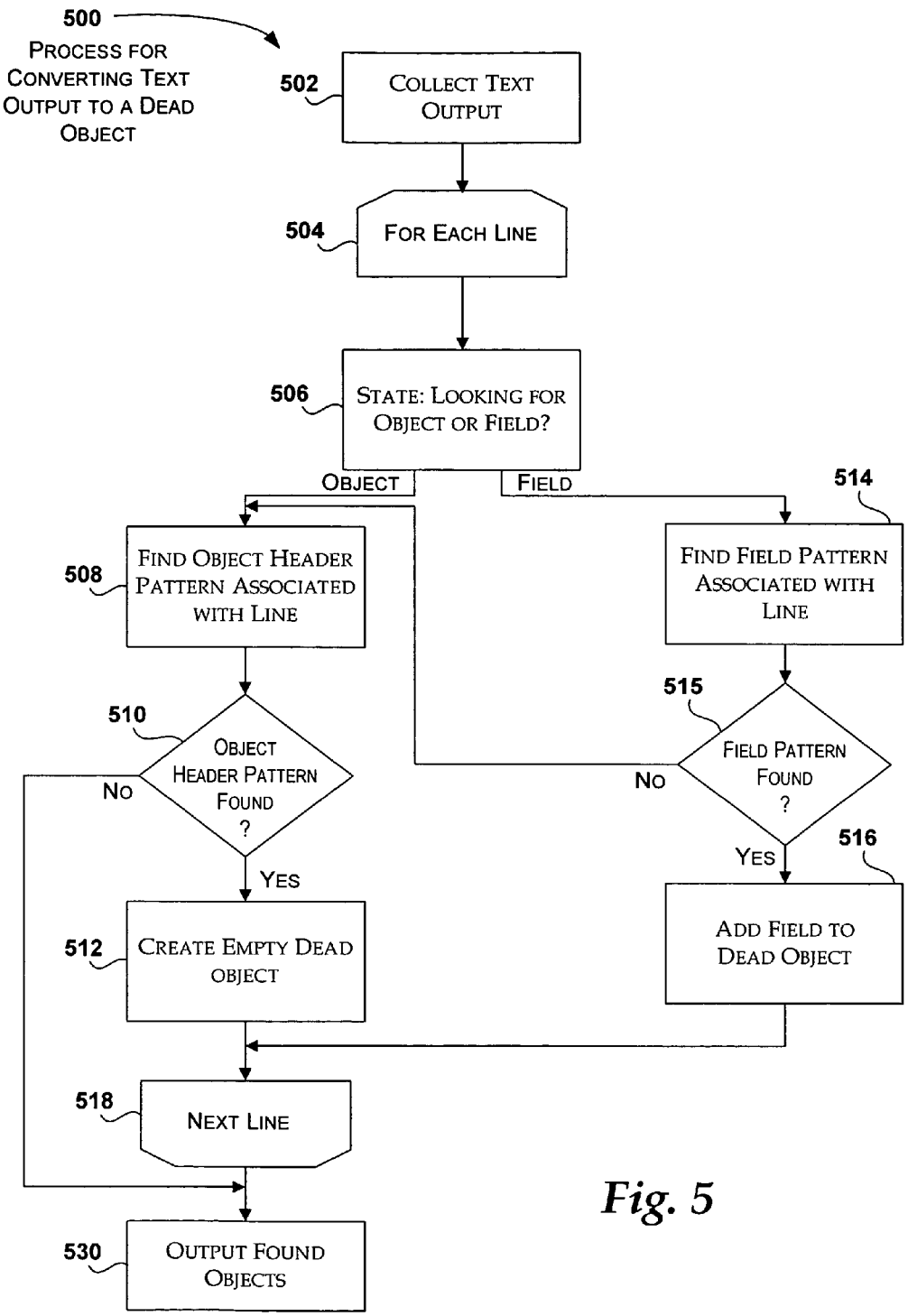
FIG. 5 is a flow diagram illustrating an exemplary text conversion process for converting text output from the traditional command into a dead object, the text conversion process being suitable for use within the flow diagram illustrated in FIG. 4.

FIG. 4 is a flow diagram illustrating an exemplary process for processing a traditional command within the framework shown in FIG. 2 utilizing the present text conversion mechanism. At block 402, a traditional command is obtained. The traditional command may be obtained through various means, such as command-line input, audio, and the like. FIG. 3 illustrates obtaining the traditional command via a command-line prompt: C:\>showuser.exe. As mentioned above, the traditional command does not itself utilize the features of the framework. Instead, the traditional command executes as a stand-alone executable and produces textual output. One advantage for using the present text conversion mechanism with this framework is that the traditional commands do not have to undergo any changes in code in order to have their output utilized with the additional features of the framework.

At block 404, an output template associated with the traditional command is identified. Because each traditional command has a template that describes its output, there may be numerous templates. Therefore, the template associated with the traditional command that is currently being processed is identified. The identification may occur by registry, wrapper, and the like. For example, if a wrapper is utilized, each .exe has an associated wrapper script. Continuing with the example in FIG. 3, the showuser.exe has a wrapper script named showuser.script. Each wrapper script includes a line specifying the text conversion cmdlet, the executable, and the output template. Thus, the showuser.script may have a line such as: text2framework showuser.exe $showusertemplate. Thus, the output template identified as showusertemplate is used whenever the showuser.exe command is entered. In another embodiment, there may be a lookup mechanism for associating the executable with the corresponding output template. These and other mechanisms provide a means for mapping a template to a traditional command.

In addition, each variation of a command may be mapped to a different template. For example, the output of a 'dir' command and a 'dir/w' may each be mapped to a separate template in order to handle the corresponding output format. Thus, the mapping means may map a traditional command to a template based on switch arguments associated with the traditional command.

At block 406, the traditional command is executed to produce the text output. As mentioned above, because the execution of the traditional command produces text output, the traditional command can not utilize many of the features offered within the framework. Therefore, as will be described below, the text is converted into an object which can then be utilized by the features within the framework At block 408, the text is converted into an object based on the description within the associated output template. Briefly, described below in detail in conjunction with FIG. 5, the text conversion cmdlet collects the text and attempts to match lines within the collected text to patterns identified within the output template. FIG. 5 now describes this process in more detail.

FIG. 5 is a flow diagram illustrating an exemplary text conversion process for converting text output from the traditional command into a dead object, the text conversion process being suitable for use within the flow diagram illustrated in FIG. 4.

At block 502, the text output from the traditional command is collected. The collected text output is assigned to a variable. In one embodiment, the text output may be collected as an array of strings. To support this embodiment, the framework may assign argument(0) of the command line within the script (i.e., the traditional command) to a command variable and assign argument(1) (i.e., the output template) to a template variable. The command variable and the template variable are accessible to the text conversion cmdlet for further processing. The text conversion cmdlet may then initiate another cmdlet that performs the process of collecting the text output into an output variable. The text conversion cmdlet may initiate this cmdlet by including the following statement: $output=invoke-command $command. The invoke-command cmdlet is a cmdlet 210 provided by the framework 200 shown in FIG. 2.

At begin loop 504, each line within the collected text output (i.e., $output) is processed via blocks 506-516. Then, a next line is obtained at end loop 518 until all the lines within $output have been processed.

At block 506, the state of the processing determines the flow. If the process is looking for an object, processing continues at block 508. If the process is looking for a field, processing continues at block 514.

At block 508, an object header pattern specified for the object header indicator is located. If an object header pattern is not found, processing proceeds to block 530 where each of the objects that were found are output. However, if the object header pattern is found, processing continues at block 512.

At block 512, a new empty dead object is created. In one embodiment, the new object that is created is in a form of a hash table that has no form of its own. Rather, the hash table is a collection of properties and values. Thus, referring to the example illustrated in FIG. 3, a statement such as $o=new hashObject( ), may be implemented. For simplicity, the decision block that determines whether the new object should be a live object or a dead object is omitted from this FIG. 5. As discussed above, if the new object takes the form of a "live" object, the new object will have methods associated with its specific data type. This allows the new object to provide additional processing not available if the new object takes the form of a "dead" object. Determining whether the new object should take the form of a "live" or "dead" object may be based on information within the output template, a look-up table, and other means. In one embodiment, referring back to FIG. 3, the output template may include a live object indicator 326 and an associated live object type 328. The processing performed for creating a live object is described below in conjunction with FIG. 6. Processing continues at end loop 518.

At block 514, when in the state is looking for a field, a field pattern associated with the line is located and processing proceeds to decision block 515. At decision block 515, a determination is made whether a field pattern associated with the line was located. If not, processing changes to the looking for an object state at block 508. If the field pattern is found, processing continues at block 516. At block 516, a new field for the dead object is created. Referring again to the example illustrated in FIG. 3, a statement such as o.name="Kumar", may be implemented when the first line is processed and a statement such as o.domain="NTDEV", may be implemented when the second line is processed. Thus, the properties and values are populated for the new object based on the text output produced from the traditional command. Processing continues at end loop 518.

As described above, end loop 518 gets another line for processing until each of the lines within the collected text has been processed. Once all the lines within the collected text have been processed, processing continues at block 530.

At block 530, each object with its associated properties are output. These one or more objects may then be pipelined to other cmdlets within the framework so that additional information can be obtained. Thus, by utilizing the present text conversion mechanism within the above described framework, traditional commands may operate as if they were written as a cmdlet and will have access t0 all the diverse capabilities provided by the framework.

In certain situations, the field will itself be an object. When this occurs, processing switches to the looking for an object state at 508.

FIG. 6 is a flow diagram illustrating an exemplary text conversion process for converting text output from the traditional command into a live object, the text conversion process being suitable for use within the flow diagram illustrated in FIG. 4. Process 600 is similar to process 500 with a few modifications. The blocks having the same reference numbers as in FIG. 5 perform the processing as described above. The modifications are now described for process 600.

Once it is determined that an object header pattern has been found at decision block 510, processing continues at block 612. At block 612, the object type name associated with the object header pattern is noted. Because some objects do not support a default constructor, an empty live object is not created at this point. Rather, as will be described, the live object is created after each of the fields associated with the object has been determined. Processing continues at end loop 518 as described above.

In another modification, after it has been determined that the field pattern associated with the line has been found at decision block 515, processing continues at block 616. At block 616, the field type and associated value are noted. As explained above, this information will be used when the live object is created. From block 616, processing continues at decision block 618.

At decision block 618, a determination is made whether all the fields have been found. If all the fields have not been found, processing continues at block 518 and proceeds as described above. However, if all the fields have been found, processing continues at block 620.

At block 620, a live object is created based on the object type and the field types and values that were noted in blocks 612 and 616, respectively. In one embodiment, a constructor for the object is called with suitable parameters, thus creating the live object. Processing then continues at block 518 and proceeds as described above.

While the processing of dead objects and live objects is illustrated in separate flow diagrams, one skilled in the art will appreciate that the flow diagrams illustrated in FIG. 5 and FIG. 6 may be combined so that both live objects and dead objects may be created from the collected output.

Importantly, even though traditional commands have various formats for the text output that they generate, the only unique component of the present text conversion mechanism for each traditional command is the output template. Therefore, there is minimal effort in integrating a traditional command for use as a cmdlet within the framework.

The present mechanism for converting text output into objects may be performed such that the parsing of the output of the traditional command is performed in parallel as the traditional command generates the output. In another alternative, the parsing of the output may be performed using output stored in a disk file. In another alternative, the traditional command may be executed on a machine running a different operating system than the local machine. The output of the traditional command is then made available to the local machine which performs the present conversion.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method, comprising:
    parsing, within an object-based administrative tool framework, an input data stream and based on data being derived from the parsing, to instantiate one or more application programming interfaces (APIs), wherein at least one or more APIs is utilized to construct one or more objects to represent the parsed data, populate and validate contents of the one or more objects, and pass the one or more objects through a pipeline being exposed within a user-interface command application for further processing;
    creating a unique template describing a text output of a traditional command, the template comprising an object state indicator for determining whether a live object is to be created, wherein the created live object includes a method that is directly invocable by one of the one or more APIs within the object-based administrative tool framework, wherein the template includes a field indicator and a corresponding field pattern; and
    converting, when the object state indicator does not indicate creating the live object, the text output into a dead object, the text output not being in a standardized format and the dead object not having a method that is directly invocable, wherein converting the text output into a dead object includes invoking one of the one or more APIs to create a hash object; and
    wherein the field indicator and the field pattern are utilized by the one or more APIs to process one or more objects created within the object-based administrative tool framework.

2. The method of claim 1, wherein the template further comprises an object header indicator and a corresponding object header pattern and wherein converting the text output comprises creating the dead object based on the object header pattern identified within the text output.

3. The method of claim 2, wherein converting the text output further comprises specifying a field associated with the dead object when creating the dead object based on the field pattern.

4. The method of claim 3, wherein the field pattern comprises a regular expression.

5. The method of claim 1, wherein the traditional command is executed outside the object-based administrative tool framework.

6. The method of claim 1, wherein converting the text output into the dead object comprises:
    collecting the text output as an away of strings, each string representing one line within the text output;
    obtaining an object type from the string associated with the object header pattern;
    obtaining a field type and associated value from the string associated with the field pattern; and
    creating a new dead object based on the object type and the field type.

7. The method of claim 6, wherein the field pattern describes the output text that is assigned as a value for the field type.

8. At least one computer-readable medium storing computer-executable instructions that, when executed on a computer, perform the following steps:
    parsing, within an object-based administrative tool framework, an input data stream and based on data being derived from the parsing, to instantiate one or more application programming interfaces (APIs), wherein at least one or more APIs is utilized to construct one or more objects to represent the parsed data, populate and validate contents of the one or more objects, and pass the one or more objects through a pipeline being exposed within a user-interface command application for further processing;
    describing output text generated from a source as an output template, the output template including an object state indicator for determining whether a live object is to be created, wherein the created live object includes a method that is directly invocable by one of the one or more APIs within the object-based administrative tool framework, wherein the output template includes a field indicator and a corresponding field pattern; and
    converting, when the object state indicator does not indicate creating the live object, the output text into a dead object, wherein the output text is not in a standardized format and the dead object does not have a method that is directly invocable, wherein converting the text output into a dead object includes invoking one of the one or more APIs to create a hash object, and
    wherein the field indicator and the field pattern are utilized by the one or more APIs to process one or more objects created within the object-based administrative tool framework.

9. The computer-readable medium of claim 8, wherein the output template further comprises an object header indicator and a corresponding object header pattern.

10. The computer-readable medium of claim 8, wherein the field pattern comprises a regular expression.

11. The computer-readable medium of claim 8, wherein the source comprises a traditional command.

12. The computer-readable medium of claim 11, wherein the traditional command is executed outside the object-based administrative tool framework.

13. The computer-readable medium of claim 8, wherein converting the output text into the dead object comprises:
   collecting the output text as an away of strings, each string representing one line within the output text;
   obtaining an object type for the string that matches the object header pattern;
   obtaining a new field type for the string that matches the field pattern; and
   creating the dead object based on the object type and the field type.

14. The computer-readable medium of claim 13, wherein the field pattern obtained from the output text is assigned as a value for the field type.

15. A system, comprising:
   a processor; and
   a memory for storing program modules and data, including:
   an object-based administrative tool framework for parsing an input data stream and based on data being derived from the parsing, instantiating one or more application programming interfaces (APIs), wherein at least one or more APIs is utilized to construct one or more objects to represent the parsed data, populate and validate contents of the one or more objects, and pass the one or more objects through a pipeline being exposed within a user-interface command application for further processing;
   a template for describing text output generated from a source, the template comprising an object state indicator for determining whether a live object is to be created, wherein the created live object includes a method that is directly invocable by one of the one or more APIs within the object-based administrative tool framework, wherein the template includes a field indicator and a corresponding field pattern; and
   a conversion component for converting, when the object state indicator does not indicate creating the live object, the text output into a dead object, wherein the text output is not in a standardized format and the dead object does not have a method that is directly invocable, wherein the converting the text output into a dead object includes invoking the one or more APIs to create a hash object, and
   wherein the field indicator and the field pattern are utilized by the one or more APIs to process one or more objects created within the object-based administrative tool framework.

16. The system of claim 15, wherein the template further comprises an object header indicator and a corresponding object header pattern and wherein the conversion component creates the dead object based on the object header pattern identified within the text output.

17. The system of claim 16, wherein the conversion component specifies a field when creating the dead object based on the field pattern identified within the text output.

18. The system of claim 17, wherein the field pattern comprises a regular expression.

19. The system of claim 15, wherein the text output is generated by a traditional command.

20. The system of claim 19, wherein the traditional command is executed within the object-based administrative tool framework.

21. The system of claim 19, wherein the traditional command is executed outside of the object-based administrative tool framework.

22. The system of claim 15, wherein the conversion component is configured to:
   collect the text output as an array of strings, each string representing one line within the text output;
   obtain an object type for the string that matches the object header pattern;
   obtain a field type for the string that matches the field pattern; and
   create the dead object based on the object type and the field type.

23. The system of claim 22, wherein the field pattern obtained from the output text is assigned as a value for the field type.

* * * * *

UNITED STATES PATENT AND TRADEMARK OFFICE
CERTIFICATE OF CORRECTION

| | | |
|---|---|---|
| PATENT NO. | : 7,665,074 B2 | Page 1 of 1 |
| APPLICATION NO. | : 10/998477 | |
| DATED | : February 16, 2010 | |
| INVENTOR(S) | : Bhalchandra S. Pandit et al. | |

It is certified that error appears in the above-identified patent and that said Letters Patent is hereby corrected as shown below:

Column 10, line 21, in Claim 6, delete "away" and insert -- array --, therefor.

Column 11, line 10, in Claim 13, delete "away" and insert -- array --, therefor.

Signed and Sealed this
Eighth Day of February, 2011

David J. Kappos
*Director of the United States Patent and Trademark Office*